United States Patent [19]
Hammer

[11] 4,097,118
[45] Jun. 27, 1978

[54] OPTICAL WAVEGUIDE COUPLER EMPLOYING DEFORMED SHAPE FIBER-OPTIC CORE COUPLING PORTION

[75] Inventor: Jacob Meyer Hammer, Lawrenceville, N.J.

[73] Assignee: RCA Corporation, New York, N.Y.

[21] Appl. No.: 627,354

[22] Filed: Oct. 30, 1975

[51] Int. Cl.² ............................................. G02B 5/14
[52] U.S. Cl. .................................. 350/96.17; 350/320
[58] Field of Search ............ 350/96 C, 96 WG, 96 R, 350/320

[56] References Cited
U.S. PATENT DOCUMENTS

| | | | |
|---|---|---|---|
| 2,186,143 | 1/1940 | Neugass | 350/96 R X |
| 3,777,149 | 12/1973 | Marcatili | 350/96 C X |
| 3,819,249 | 6/1974 | Borner et al. | 350/96 WG |
| 3,871,743 | 3/1975 | Fulenwider | 350/96 C X |
| 3,912,363 | 10/1975 | Hammer | 350/96 C |

OTHER PUBLICATIONS

Ash et al., Article in IBM Technical Disclosure Bulletin, Feb. 1971, pp. 2529–2530.

*Primary Examiner*—John K. Corbin
*Assistant Examiner*—John D. Lee
*Attorney, Agent, or Firm*—H. Christoffersen; Samuel Cohen; George J. Seligsohn

[57] ABSTRACT

More efficient optical coupling between light wave energy traveling in a fiber-optic, which may be a multimode fiber-optic, and single or few mode light wave energy traveling in a planar optical waveguide is accomplished by deforming the initially cylindrical shape of the coupled portion of the fiber-optic core, such as by flattening the coupled portion of the fiber-core in a direction substantially perpendicular to the plane of the planar optical waveguide and fanning out this portion of the fiber-optic core in a direction substantially parallel to the plane of the planar optical waveguide.

3 Claims, 7 Drawing Figures

OPTICAL WAVEGUIDE COUPLER EMPLOYING DEFORMED SHAPE FIBER-OPTIC CORE COUPLING PORTION

The Government has rights in this invention pursuant to Contract No. N0014-75-C-0436 awarded by the Department of the Navy.

The present invention relates to the invention disclosed and claimed in United States patent application Ser. No. 627,353 filed on even date herewith and assigned to the same assignee as the present invention.

BACKGROUND OF THE INVENTION

The present invention is concerned with improvements to the type of optical coupler disclosed in U.S. Pat. No. 3,912,363, which issued to Jacob M. Hammer on Oct. 14, 1975 and is assigned to the assignee of the present application. The subject matter disclosed in U.S. Pat. No. 3,912,363 is concerned with achieving optical coupling between a fiber-optic waveguide and a planar optical waveguide by providing techniques for phase matching intercoupled evanescent fields of light wave energy traveling respectively in the two types of waveguides.

SUMMARY OF THE INVENTION

The present invention is directed to improving the optical efficiency with which optical coupling of light wave energy by phase-matching evanescent fields between a fiber-optic waveguide and a planar optic waveguide may be achieved. More specifically, in accordance with the principles of the present invention, more efficient optical coupling between light wave energy traveling in a fiber-optic, which may be a multimode fiber-optic, and single or few mode light wave energy traveling in a planar optical waveguide is accomplished by deforming the initially cylindrical shape of the coupled portion of the fiber-optic core, such as by flatening the coupled portion of the fiber-optic core in a direction substantially perpendicular to the plane of the planar optical waveguide and fanning out this portion of the fiber-optic core in a direction substantially parallel to the plane of the planar optical waveguide.

THE DRAWINGS

FIG. 1 exemplifies a typical prior art arrangement for optically coupling light wave energy between a fiber-optic having a cylindrically-shaped core and a planar waveguide by phase-matched intercoupled evanescent fields, such as that shown and described in the aforesaid U.S. Pat. No. 3,912,363;

FIGS. 2a and 2b, respectively, show side and top views of a first embodiment of a deformed spatulate fiber-optic shape determined in accordance with the principles of the present invention;

DETAILED DESCRIPTION

Figure 1:
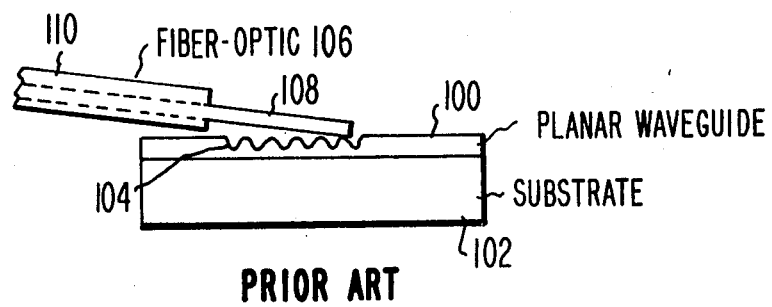

The prior art arrangement shown in FIG. 1 is similar, in all material respects, to the arrangement of FIGS. 4a and 4b of the aforesaid U.S. Pat. No. 3,912,363. Specifically, planar waveguide 100, in the form of a thin film on substrate 102, is provided with a surface diffraction grating 104. The fiber-optic 106, consisting of a core 108 covered with a cladding 110, is arranged with an end portion of its core 108 in close proximity to grating 104 of planar waveguide 100. A fiber-optic has a cylindrically-shaped core, which is usually circularly cylindrical but may be other than circularly cylindrical. As described in detail in the aforesaid U.S. Pat. No. 3,912,363, the diffraction grating 104 is composed of grating lines having a given line spacing which are oriented at a predetermined angle with respect to core 108. The given line spacing and predetermined angle of orientation are selected to provide proper phase matching by evanescent fields between light wave energy traveling in core 108 and light wave energy traveling in a preselected direction in planar waveguide 100.

It has been found, both on theoretical and experimental grounds, that the difference in the respective shapes of both diffraction grating 104 portion and the flat portion of the surface of planar waveguide 100 with respect to the cylindrical shape of core 108 results in relatively low optical efficiency being achieved in the coupling of light wave energy between core 108 and planar waveguide 100 by evanescent fields. In particular, a fiber-optic is generally a multimode optical waveguide, while a planar optical waveguide is capable of supporting only a single or few modes which have wave vectors parallel to the waveguide plane. In the prior art arrangement of FIG. 1, only a relatively few of the total multimodes, at best, of the cylindrical core have wave vectors that are phase matched by evanescent fields to the single or few modes of the planar optical waveguide, to thereby provide optical coupling therebetween. This is one of the reasons for the relatively low optical efficiency of the optical coupling provided by the prior art arrangement of FIG. 1.

In addition, when a diffraction grating 104 is employed to provide phase matching, it is impossible to provide intimate contact between cylindrical core 108 and the undulating surface of planar waveguide 100 in the region of grating 104. This condition further reduces the optical efficiency with which wave energy can be coupled between core 108 and planar waveguide 100 by phase-matched evanescent fields, when a diffraction grating is employed.

However, in accordance with the principles of the present invention, one can consider that a "single" mode planar optical waveguide is itself really a device which has a continuum of modes with wave vectors, all of which have the same given magnitude, but which are oriented in any possible direction parallel to the waveguide plane. It then becomes possible to modify the initial cylindrical shape of the coupling portion of core 108 in a manner which provides effective coupling of multimode light wave energy in core 108 to planar waveguide 100, or vice versa, by phase matched evanescent fields.

Figure 2A:
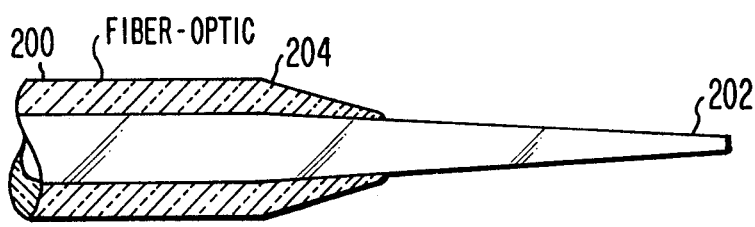
Figure 2B:
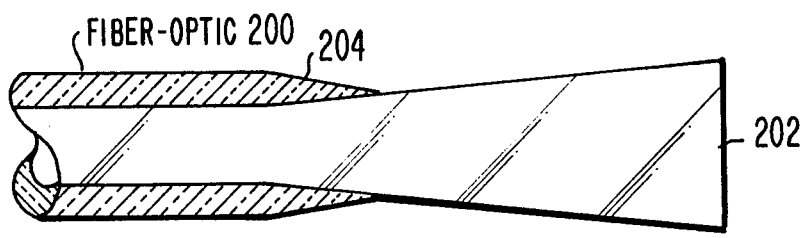

Specifically, as shown in FIGS. 2a and 2b, if the end portion of the cylindrical core of a conventional fiber-optic 200 is flattened in one orthogonal direction and is fanned out in the other orthogonal direction, as shown by core 202 (shown in side view FIG. 2a and top view FIG. 2b), then the various modes in a multimode fiber can be forced into a modal distribution similar to that characteristic of a planar waveguide by orienting core 202 in substantial contact with the surface of a planar waveguide with the fanned-out plane of FIG. 2b being oriented substantially parallel to the surface of the planar waveguide.

As known in the art, the index of refraction of the core of a fiber-optic is somewhat higher than that of its cladding. However, the index of refraction of the core of a fiber-optic is still usually substantially lower than the index of refraction of the planar waveguide material (which may, for example, consist of a thin film of lithium niobate-tantalate on a lithium tantalate substrate). By terminating cladding 204 of fiber-optic 200 at an appropriate point (determined by the relative indices of refraction); either before or somewhat after the tapered region of core 202, the stronger index of refraction difference between the tapered region of core 202 and its surroundings (air or vacuum) insures that higher orders of the optical-fiber modes are retained. In an alternative arrangement, not specifically shown, cladding 204 may be removed solely from the contacting surface of core 202, so that the top and sides of the coupling portion of core 202 remain covered by cladding 204.

Figure 3:
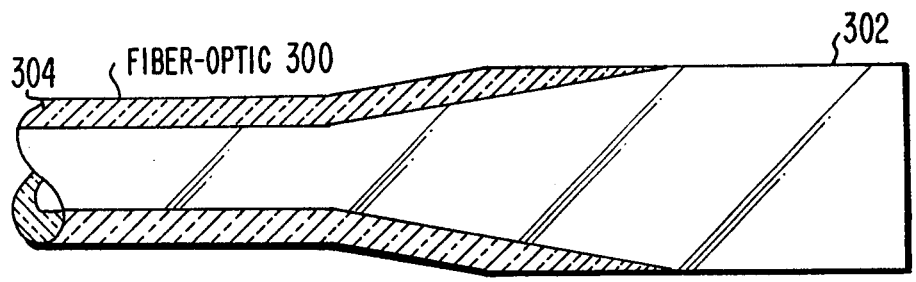
FIG. 3 shows a second embodiment of a deformed spatulate fiber-optic shape determined in accordance with the principles of the present invention.

The embodiment shown in FIG. 3 differs from that shown in FIGS. 2a and 2b only in the modification of the shape of the spatulated end of core 302 of fiber-optic 300. The purpose of FIG. 3 is to illustrate the fact that by using various shaped flattenings and flares for the spatulated end of the fiber-optic core, a variety of distributions of wave vectors can be imposed, so that design of desired coupling orientations is reduced to that of merely getting wave energy from one essentially planar waveguide to a second essentially planar waveguide with relatively high efficiency by phase-matched evanescent fields, which is straight forward and is known in the art.

In practice, the desired shaping of the initially cylindrical core of a fiber-optic 200 or 300 may be achieved by placing the core in a polished (e.g. vitreous) carbon die under suitable heat and pressure to thereby deform the end of the fiber-optic core within the die.

Although a fiber-optic core having a spatulated end, such as shown in FIGS. 2a, 2b and 3, is preferably employed in optically coupling wave energy to a planar waveguide through a diffraction grating, as shown in FIG. 1, it is not always essential that the optical coupling take place through a diffraction grating. Thus, the spatulated end of the fiber-optic core, such as shown in FIGS. 2a, 2b and 3, in certain cases, may be directly placed in cooperative relationship with the flat surface of a planar optical waveguide which does not incorporate a diffraction grating.

Figure 4:
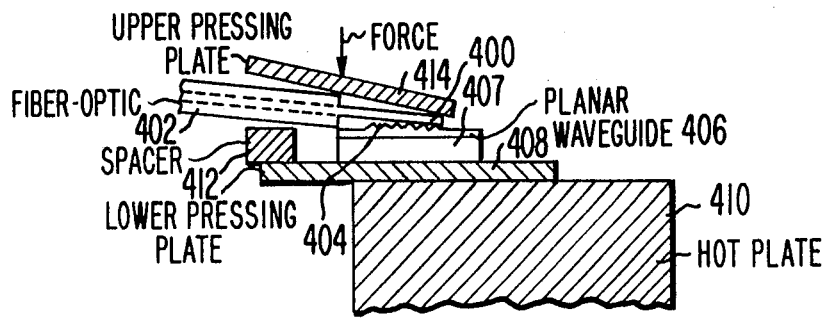
FIG. 4 shows an arrangement in which a fiber-optic, initially having a cylindrically-shaped core of the fiber-optic of FIG. 1 or the spatulate shapes of FIGS. 2a, 2b and FIG. 3, may be deformed to conform with the undulating shape of a diffraction grating in the surface of a planar waveguide.

FIG. 4 shows a method for deforming core 400 of fiber-optic 402 so that it conforms with the undulating surface of diffraction grating 404 of planar waveguide 406. Fiber-optic core 400 may have its initial cylindrical shape or, alternatively, it may already have been deformed into a spatulate shape, such as shown in FIGS. 2a, 2b and 3. As shown in FIG. 4, a lower pressing plate 408, which rests on hot plate 410 supports substrate 407 having planar waveguide 406 deposited thereon. Fiber-optic 402 is situated on top of planar waveguide 406, with core 400 in contact with the undulating surface of diffraction grating 404 and with spacer 412 situated as shown between lower pressing plate 408 and the cladding of fiber-optic 402 to provide physical support for fiber-optic 402. Upper pressing plate 414, to which an external force is applied, is placed on top of fiber-optic 402 in contact with core 400. The external force may be applied with a weight or any other means to apply pressure. The angular displacement from the horizontal of upper pressing plate 414 is shown greatly exaggerated in FIG. 4.

Under the influence of heat from hot plate 410 and the pressure from the applied force, the material of which core 400 is composed (glass or plastic) softens and flows into the crevices of diffraction grating 404, thereby causing core 400 to be embossed with a negative replica of the grating pattern of diffraction grating 404.

Figure 5:
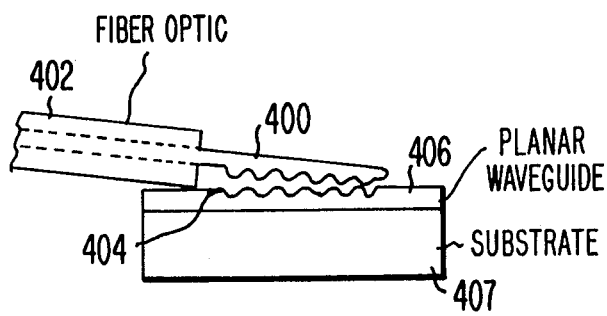
FIG. 5 shows the optical coupling between a fiber-optic, which has been deformed by the arrangement of FIG. 4, and a planar waveguide which incorporates a surface diffraction grating.

In an alternative arrangement, heating may be accomplished in an oven, rather than by the use of hot plate 410. In any case, the final result, as shown in FIG. 5, is to deform the shape of the surface of core 400 so that it is capable of intimately contacting the undulating surface of diffraction grating 404 of planar waveguide 406.

If desired, the pressure and temperature used in embossing core 400 may be selected so that core 400 is simultaneously bonded to the diffraction grating surface 404 of planar waveguide 406. For example, with a plastic fiber-optic composed of Dupont Crofan plastic and a lithium niobate-tantalate planar waveguide, embossing and bonding was accomplished with a hot plate temperature of 500° F utilizing a force provided by a ten pound weight. On the other hand, if it is desired that fiber-optic 400 be removable, a suitable parting compound, to prevent permanent bonding, may be employed.

Figure 6:
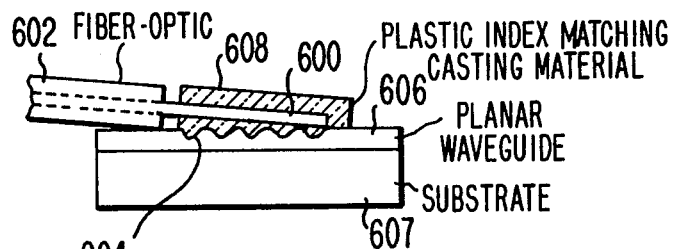
FIG. 6 shows an alternative arrangement for deforming the shape of a fiber-optic core to optically couple a fiber-optic to a planar waveguide which incorporates a diffraction grating.

An alternative technique for effectively deforming the coupling portion of a fiber-optic core to obtain intimate contact with the undulating surface of a diffraction grating in a planar waveguide is shown in FIG. 6. Specifically, the coupling portion of undeformed core 600 of fiber-optic 602 is physically coupled to the undulating surface of diffraction grating 604 of planar waveguide 606 on substrate 607 by a plastic index matching casting material 608 added to the initially cylindrically shaped coupling portion of core 600. Material 608, which should have an index of refraction equal to or higher than the index of refraction of undeformed core 600 and lower than that of planar waveguide 606, is poured around undeformed core 600 to form a grating pattern which is bonded to the undulating surface of diffraction grating 604 of planar waveguide 606. An example of plastic index matching casting material which may be employed is Castolite AP.

What is claimed is:

1. A method for increasing the optical efficiency with which a) each of a plurality of different modes of multimode light traveling in a first transmission medium comprising a multimode fiber-optic core having an initially cylindrical shape, and b) light having a given modal characteristic traveling in a second transmission medium comprising a planar optical waveguide cooperatively disposed with respect to a coupling portion of said core, can be coupled between said two transmission media by phase-matched evanescent fields, said method comprising the step of:

flattening out said initially cylindrical shape of said coupling portion of said fiber-optic core in a direction substantially perpendicular to the plane of said planar optical waveguide and fanning out said initially cylindrical shape of said coupling portion of said fiber-optic core in a direction substantially parallel to the plane of said planar optical waveguide to deform said coupling portion of said fiber-optic core into a predetermined spatulate shape that provides more efficient optical coupling by phase-matched evanescent fields of multimode light wave energy between said coupling portion of said fiberoptic core and said planar optical waveguide by forcing said modes of multimode light into a modal distribution similar to said given modal characteristic.

2. The method defined in claim 1, wherein said planar optical waveguide is substantially a single mode waveguide for light wave energy having a given magnitude wave vector traveling in said planar optical waveguide; and wherein said step of flattening further comprises the step of:

flattening said coupling portion of said core into a certain predetermined spatulated shape which forces various modes of light wave energy traveling in said fiber-optic core into modes all having substantially said given magnitude wave vector but traveling along different paths all of which are substantially parallel to the plane of said planar optical waveguide.

3. The method defined in claim 2, wherein said step of flattening includes the step of:

shaping the specific contour of the flattening and flare of the said certain predetermined shape to determine the specific orientation in said planar optical waveguide of light wave energy coupled thereto from said fiber-optic core by controlling the direction of each of said different paths.

* * * * *